(12) United States Patent
Deeds et al.

(10) Patent No.: US 6,835,582 B1
(45) Date of Patent: Dec. 28, 2004

(54) MICROCHIP-LEVEL OPTICAL INTERCONNECT

(75) Inventors: Michael A. Deeds, Port Tobacco, MD (US); Kevin Cochran, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 203 days.

(21) Appl. No.: 10/342,656

(22) Filed: Jan. 15, 2003

(51) Int. Cl.[7] .............................................. H01L 21/00
(52) U.S. Cl. ...................................................... 438/27
(58) Field of Search ....................... 438/27, 42, 22–23, 438/800

(56) References Cited

U.S. PATENT DOCUMENTS

| | | | |
|---|---|---|---|
| 5,717,803 A | 2/1998 | Yoneda et al. ................ 385/89 |
| 5,852,696 A | 12/1998 | Collins et al. ................ 385/88 |
| 6,019,523 A | 2/2000 | Honmou ....................... 385/94 |
| 6,074,888 A | * 6/2000 | Tran et al. .................... 438/39 |
| 6,300,151 B1 | 10/2001 | Yoon et al. ................... 438/27 |
| 6,572,743 B2 | * 6/2003 | Miller et al. ........... 204/297.06 |
| 2002/0005574 A1 | * 1/2002 | Zhou ........................... 257/680 |
| 2002/0090761 A1 | * 7/2002 | Goldmann et al. ......... 438/124 |

* cited by examiner

*Primary Examiner*—Craig A. Thompson
(74) *Attorney, Agent, or Firm*—Mark Homer

(57) ABSTRACT

A method of sealing an optical fiber in a microchip includes providing a device microchip, a top microchip and an optical fiber; forming a groove in at least one of the device microchip and the top microchip; coating metal on the optical fiber; depositing metal on the groove and top surfaces of the device microchip and the top microchip; depositing solder on the top surface of at least one of the device microchip and the top microchip; placing the optical fiber in the groove; placing the top microchip on the device microchip; and reflowing the solder to form a hermetic seal.

20 Claims, 2 Drawing Sheets

MICROCHIP-LEVEL OPTICAL INTERCONNECT

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to optical connections to microchips, and more particularly to optical connections to microchips having an effective environmental seal.

Micro-optical electromechanical systems (MOEMS) is a relatively new technology. Traditional optical packages are hermetic at the carrier level. These packages are very expensive from a materials and fabrication standpoint. In addition, the critical optical components are not protected until the final packaging step, which typically lowers yield. Greater losses are incurred when yield losses are experienced in this final packaging step. Also, because a greater variety of materials exist inside the larger carrier level package, reliability concerns are amplified due to out gassing and corrosion, often limiting material selection.

U.S. Patent Application Publication 20020090761 discloses a hermetic sealing method for an electronic circuit module, however, it does not disclose a method of sealing a fiber optic into the circuit module.

U.S. Pat. No. 6,300,151 discloses a method of aligning an optical fiber to an optical module. However, the fiber interconnect and hermetic sealing is not discussed.

U.S. Pat. No. 6,019,523 discloses a method of aligning an optical fiber. A noise reducing seal is made from the external environment. The seal is not hermetic. It is possible that moisture may enter through the entire package.

U.S. Pat. No. 5,852,696 relates to a coupling structure of an optical fiber and an optical semiconductor element. A V groove is formed using known masking and anisotropic etching techniques. An optical fiber is bonded into the V groove using an index matching UV curable adhesive or other suitable known adhesive. A chip and optical fiber hermetic seal is not disclosed.

U.S. Pat. No. 5,717,803 discloses optical fibers arranged in a V groove formed at the surface of a silicon substrate and a cover provided thereon. This is an optical coupling device without an environmental seal.

SUMMARY OF THE INVENTION

It is an object of the invention to hermetically seal a top chip and an optical fiber interconnect to a micromachined device, thereby eliminating the need for a hermetic carrier level package.

The invention will be better understood, and further objects, features, and advantages thereof will become apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

A chip level hermetic package provides protection of critical devices much earlier in the packaging process, increasing yields and reducing the expense of each yield loss. The inventive package is preferable formed from batch fabrication of silicon, thereby dramatically reducing material and fabrication costs. The chip level seal provides protection from later packaging process steps and materials and has the potential to increase device reliability and longevity. The invention provides hermetic optical fiber interconnects and a cap seal to a micromachined device at the chip level.

Important features of the invention include an optical fiber interconnect sandwiched between two chips. Grooves in the one or both of the chips are micromachined, for example, using KOH or DRIE etching techniques. The round optical fiber is sealed in the faceted groove. A seal ring is provided around the perimeter of each chip. The sealing of the optical fiber and the chips is hermetic. An important application of the invention is to seal optical switches.

Figure 1:
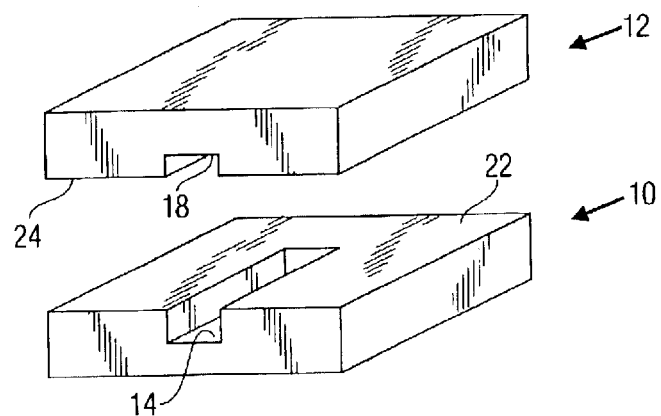
FIG. 1 is a perspective view of a device microchip and a top microchip.

FIG. 1 is a perspective view of a device microchip 10 and a top microchip 12. Microchips 10, 12 may be made of, for example, silicon, silicon on insulator, or quartz. Microchips 10, 12 have top surfaces 22,24 that mate when assembled. At least one groove 14,18 is formed in the top surface of one or both microchips 10, 12. More than one groove may be formed in the microchips, depending on the intended use. An optical fiber will be placed in groove 14,18.

Figure 2A:
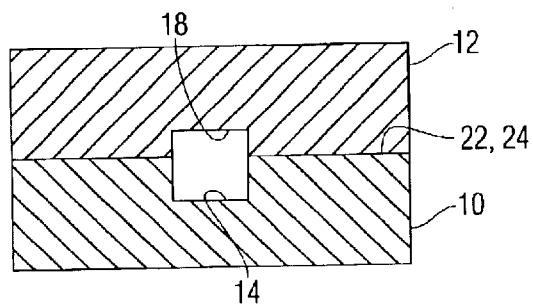
FIGS. 2A, 2B, 2C and 2D are cross-sectional views of some exemplary groove shapes.
Figure 2B:
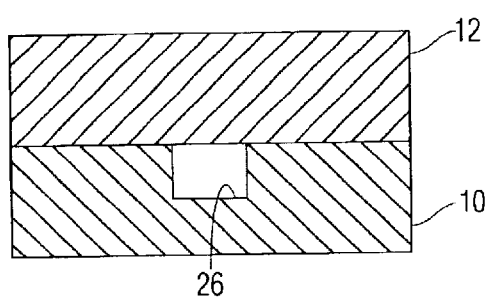
Figure 2C:
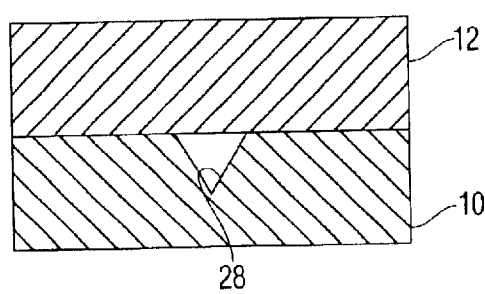
Figure 2D:
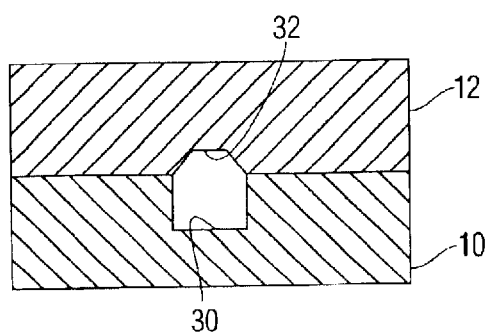

FIGS. 2A–2D are cross-sectional views of some exemplary groove shapes. FIG. 2A shows a rectangular groove 14,18 as shown in FIG. 1. In FIG. 2A, as in FIG. 1, a portion of the complete groove is located in each of the microchips 10,12. FIG. 2B shows a rectangular groove 26 that is formed only in the device microchip 10. FIG. 2C shows a V groove 28 that is formed only in the device microchip 10. In FIGS. 2B and 2C, none of the groove is formed in the top microchip 12. In FIG. 2D, a portion 30 of the faceted groove is formed in the device microchip 10 and a portion 32 of the faceted groove is formed in the top microchip 12. The grooves may be formed by known methods, for example, KOH or DRIE etching. In the remaining discussion of the inventive method, the embodiment of FIG. 2A will be used, although it should be understood that the invention is applicable to grooves having varying geometries.

Figure 3A:
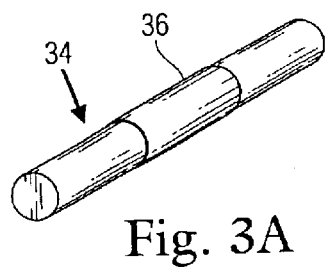
FIGS. 3A and 3B show an optical fiber.
Figure 3B:
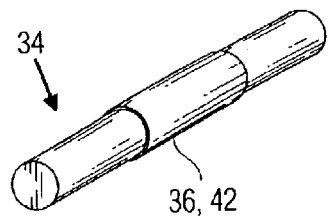

FIGS. 3A and 3B show a round optical fiber 34. As shown in FIG. 3A, at least a portion 36 of the optical fiber 34 that is to be disposed in the groove 14, 18 is coated with metal, for example, by patterning with gold. Optionally, although not necessary, the portion 36 of the optical fiber 34 that is coated with metal may additionally be coated with solder, for example by patterning. FIG. 3B shows optical fiber 34 patterned with solder 42 on the metallized area 36.

Figure 4:
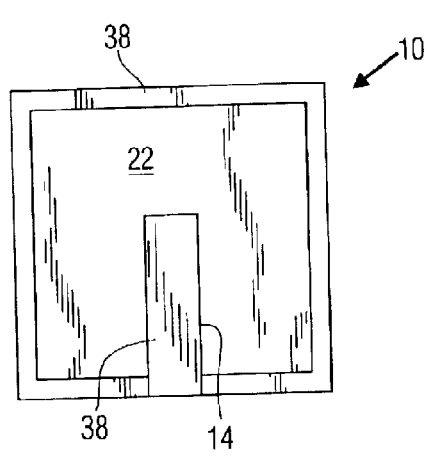
FIG. 4 is a plan view of the device microchip showing patterned metal.

Metal is deposited on the top surfaces 22, 24 of the device and top microchips 10,12 around their perimeters and in their grooves 14,18. An exemplary way to deposit the metal is by patterning with gold. FIG. 4 is a plan view of the device microchip 10 showing patterned metal 38 around the perimeter of the top surface 22 and in groove 14. In FIG. 4, all of groove 14 is shown patterned with metal 38. However, it should be understood that only a portion of groove 14 need be patterned with metal 38, preferably that portion of groove 14 adjacent the perimeter of microchip 10. Metal is similarly deposited or patterned on the top surface 24 and groove 18 of top microchip 12.

Solder may be applied to the microchips 10,12 and or optical fiber 34 in a variety of ways. At a minimum, solder is deposited on the metallized area of at least one of the top surfaces 22, 24 of the device and top microchips 10,12 to facilitate formation of the perimeter seal ring. For example, the solder may be patterned on the metallized area around the perimeter prior to assembly of the two microchips, or the solder may be dispensed on the metallized area to form the perimeter seal ring as part of an assembly step of the two microchips. Alternatively, solder may be deposited on the metallized area around the perimeter of both microchips 10,12.

Figure 5:
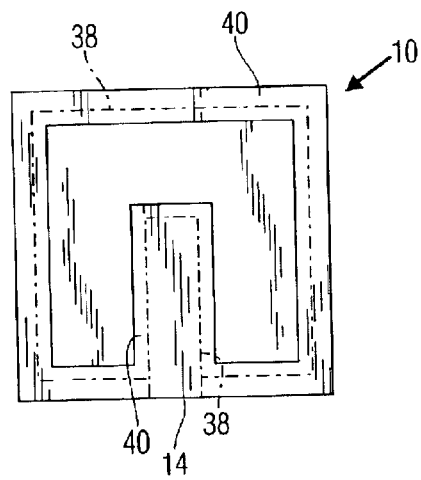
FIG. 5 is a plan view of the device microchip showing patterned solder.

In one embodiment, the solder covers only the metallized areas of the perimeters (whether applying solder to one or both microchips), for example the metallized areas of the perimeter shown in FIG. 4. In another embodiment, the solder may cover areas of the perimeter in addition to the metallized areas (whether applying solder to one or both microchips). FIG. 5 is a plan view of the device microchip 10 showing patterned solder 40 that covers areas of the perimeter in addition to the metallized areas of the perimeter shown in FIG. 4. Solder may be similarly deposited on the top microchip 12.

With regard to the groove 14 of FIG. 4 (and likewise for groove 18 in microchip 12), several variations of applying solder are possible. First, solder may not be deposited on groove 14 prior to assembling the two microchips. In such a case, solder may be coated on the optical fiber 34, or solder may be dispensed in the groove 14 as part of an assembly step, or both. Second, solder may be deposited on a portion of groove 14 that is metallized, for example, as shown in FIG. 4. Third, solder may be deposited on a portion of groove 14 that is metallized and, in addition, solder may be deposited on nonmetallized areas in and around the groove 14, as shown in FIG. 5.

Optical fiber 34 is placed in groove 14 with the metallized portion of the fiber disposed in the groove. If solder was coated on the metallized portion of the optical fiber, then the soldered and metallized portion is disposed in the groove. The microchips 10,12 are assembled with the top surfaces 22,24 facing each other. The groove 18 in top chip 12 is aligned over optical fiber 34 and groove 14 in device chip 10. The solder is then reflowed to seal the optical fiber and the two microchips. If solder was not deposited on the groove 14 or coated on the fiber 34, then solder is dispensed, for example, manually, into groove 14, 18 around optical fiber 34 to seal fiber 34.

Figure 6:
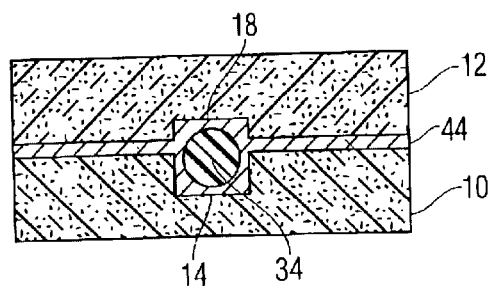
FIG. 6 is a cross-section of the assembled microchips and optical fiber.

FIG. 6 is a cross-section of the assembled microchips 10,12 and optical fiber 34 showing the seal 44 around the optical fiber 34 and between the microchips 10,12.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method comprising:

providing a device microchip, a top microchip and an optical fiber;

forming a groove in at least one of the device microchip and the top microchip;

coating metal on the optical fiber;

depositing metal on the groove and top surfaces of the device microchip and the top microchip;

depositing solder on the top surface of at least one of the device microchip and the top microchip;

placing the optical fiber in the groove;

placing the top microchip on the device microchip; and reflowing the solder to form a hermetic seal.

2. The method of claim 1 further comprising dispensing solder on the groove after the top microchip is placed on the bottom microchip.

3. The method of claim 1 further comprising depositing solder on the groove before the top microchip is placed on the bottom microchip.

4. The method of claim 3 wherein solder is deposited only on metallized portions of the groove.

5. The method of claim 3 wherein solder is deposited on both metallized and nonmetallized portions of the groove.

6. The method of claim 1 wherein solder is deposited only on metallized portions of the top surface.

7. The method of claim 1 wherein solder is deposited on both metallized and nonmetallized portions of the top surface.

8. The method of claim 1 further comprising coating solder on the optical fiber.

9. The method of claim 1 wherein solder is deposited on top surfaces of both the device and top microchips.

10. The method of claim 9 wherein the solder is deposited only on metallized areas of the top surfaces.

11. The method of claim 9 wherein the solder is deposited on areas of the top surfaces in addition to metallized areas.

12. The method of claim 1 wherein the groove is formed in both the device microchip and the top microchip.

13. The method of claim 1 wherein the device microchip and top microchip comprise one of silicon, silicon on insulator, and quartz.

14. The method of claim 1 wherein a cross-section of the groove defines a polygon.

15. The method of claim 14 wherein the groove is a V groove.

16. The method of claim 14 wherein the groove is rectangular.

17. The method of claim 1 wherein the groove is formed by one of KOH etching and DRIE etching.

18. The method of claim 1 wherein the groove is formed in the device microchip only.

19. The method of claim 1 wherein solder is deposited on the top surface of at least one of the device microchip and the top microchip before the top microchip is placed on the device microchip.

20. The method of claim 1 wherein solder is dispensed on the top surface of at least one of the device microchip and the top microchip after the top microchip is placed on the device microchip.

* * * * *